US005584955A

United States Patent [19]

Instance

[11] Patent Number: 5,584,955

[45] Date of Patent: Dec. 17, 1996

[54] METHOD OF PRODUCING LABELS

[75] Inventor: David J. Instance, Guinea Hall, Sellindge, Kent TN25 6EG, United Kingdom

[73] Assignee: David John Instance, Kent, United Kingdom

[21] Appl. No.: 351,877

[22] Filed: Dec. 8, 1994

Related U.S. Application Data

[63] Continuation of Ser. No. 82,154, Jun. 24, 1993, abandoned, which is a continuation of Ser. No. 784,428, filed as PCT/GB90/00811, May 24, 1990, published as WO90/14218, Nov. 29, 1990, abandoned.

[30] Foreign Application Priority Data

May 25, 1989 [GB] United Kingdom .................. 8912078

[51] Int. Cl.$^{6}$ .................................................. B32B 31/00

[52] U.S. Cl. ...................... 156/267; 156/307.3; 156/302; 156/244.11

[58] Field of Search .................................. 156/352, 356, 156/357, 500, 367, 368, 363, 361, 350, 244.11, 244.16, 244.25, 291, 302, 303, 553, 307.3; 281/5; 118/674; 239/541; 392/379; 264/176.1

[56] References Cited

U.S. PATENT DOCUMENTS

| | | | |
|---|---|---|---|
| 4,517,697 | 5/1985 | Vornberger | 118/411 X |
| 4,533,422 | 9/1985 | Litke | 156/307.3 |
| 4,564,410 | 1/1986 | Clitheros et al. | 156/357 X |
| 4,661,189 | 4/1987 | Voy | 156/291 X |
| 4,738,735 | 4/1988 | Joncker et al. | 156/500 X |
| 4,744,591 | 5/1988 | Instance | 281/5 |
| 5,110,615 | 5/1992 | Maiorca et al. | 156/356 X |
| 5,188,695 | 2/1993 | Colton | 156/357 X |

FOREIGN PATENT DOCUMENTS

| | | |
|---|---|---|
| 0180365 | 5/1988 | European Pat. Off. . |
| 0287695 | 10/1988 | European Pat. Off. . |
| 0304242 | 2/1989 | European Pat. Off. . |
| 1420933 | 1/1976 | United Kingdom . |
| 2164915 | 4/1986 | United Kingdom . |
| 2170176 | 7/1986 | United Kingdom . |
| 2199010 | 6/1988 | United Kingdom . |
| 2208825 | 4/1989 | United Kingdom . |
| WO85/04368 | 10/1985 | WIPO . |

*Primary Examiner*—James Engel
*Attorney, Agent, or Firm*—Hill, Steadman & Simpson

[57] ABSTRACT

A method of producing a succession of self-adhesive labels on a length of release material; the method comprising the steps of:

(a) applying a succession of patches of pressure-sensitive adhesive to a surface of a length of release material; and (b) applying a succession of individual labels to the patches of pressure-sensitive adhesive whereby each applied label is adhered to the release material by a respective patch of adhesive;

and wherein the shape and dimensions of the patches and of the applied labels are selected whereby substantially the entire rearwardly-directed surface of each applied label is coated with the pressure-sensitive adhesive and the edge of each patch is within the periphery of the respective applied label.

18 Claims, 1 Drawing Sheet

METHOD OF PRODUCING LABELS

This is a continuation, of application Ser. No. 08/082,154, filed Jun. 24, 1993, now abandoned, which is a continuation of Ser. No. 07/784,428, filed as PCT/GB90/00811, May 24, 1990 published as WO90/14218, Nov. 29, 1990 now abandoned.

BACKGROUND OF THE INVENTION

The present invention relates to a method of producing a succession of self-adhesive labels on a length of release material.

UK-A-2199010 discloses a method of and an apparatus for producing labels in which a succession of individual labels are applied to a layer of a pressure-sensitive adhesive which itself has been applied to a surface of a length of a release material and wherein the labels and the layer of pressure-sensitive adhesive are cut to form the required self-adhesive labels and waste portions of the applied labels and of the pressure-sensitive adhesive are removed from the release material. Whilst the method and apparatus disclosed in that earlier specification provide an advantage over earlier methods in that it is not required to adhere individual labels to an intermediary self-adhesive support web, the method and apparatus disclosed do suffer from an additional disadvantage in that it is required to remove excess adhesive and waste portions of the applied label.

SUMMARY OF THE INVENTION

The present invention provides a method of producing a succession of self-adhesive labels on a length of release material; the method comprising the steps of:

(a) applying a succession of patches of pressure-sensitive adhesive to a surface of a length of release material; and (b) applying a succession of individual labels to the patches of pressure-sensitive adhesive whereby each applied label is adhered to the-release material by a respective patch of adhesive; and wherein the shape and dimensions of the patches and of the applied labels are selected whereby substantially the entire rearwardly-directed surface of the applied label is coated with the pressure-sensitive adhesive and the edge of each patch is enclosed within the periphery of the respective applied label.

Preferably, the patches of pressure-sensitive adhesive are applied by means of an extruder which is adapted to extrude a series of parallel adhesive beads of predetermined length.

Alternatively, the patches of pressure-sensitive adhesive are applied by means of a dot-matrix applicator which is adapted to apply an array of dots of adhesive of predetermined shape and dimensions.

Alternatively, the patches of pressure-sensitive adhesive are applied by printing.

The individual labels may be lithographically printed sheets or folded sheets. Optionally, each applied label comprises a multiple label and the method further comprises the steps of cutting a plurality of self-adhesive labels from each applied multiple label and removing waste label portions.

BRIEF DESCRIPTION OF THE DRAWING

Embodiments of the present invention will now be described by way of example only with reference to the accompanying drawings, in which.

DETAILED DESCRIPTION OF THE PRESENTLY PREFERRED EMBODIMENTS

Figure 1:
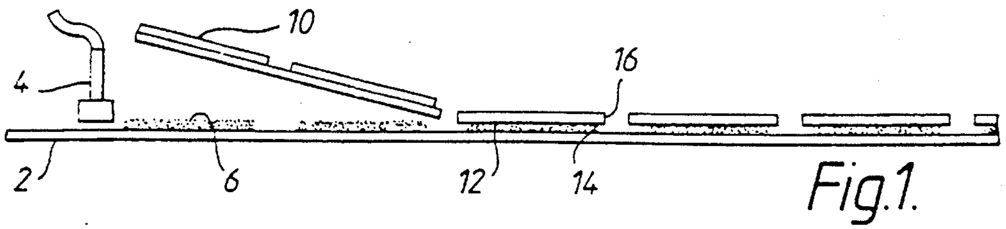
FIG. 1 is a diagrammatic elevation of an apparatus for producing self-adhesive labels in accordance with the method of a first embodiment of the present invention.
Figure 2:
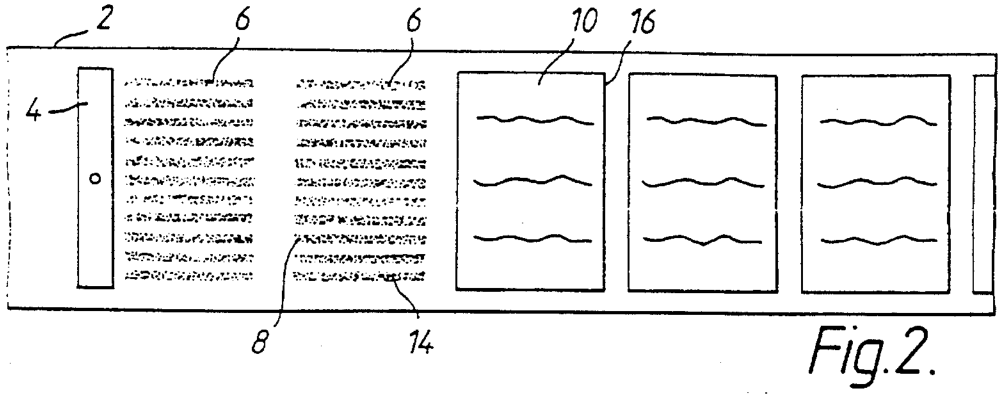
FIG. 2 is a plan view of part of the arrangement of FIG. 1.

Referring to FIGS. 1 and 2, a web of silconised release material (2), being either paper or plastics, is fed out from a reel (not shown) thereof underneath an adhesive coating head (4). The upper surface (5) of the release material (2) is siliconised. The coating head (4) applies to the upper surface of the release material (2) a succession of patches (6) of pressure-sensitive adhesive. The pressure-sensitive adhesive may be either a water based pressure sensitive adhesive, a hot-melt pressure-sensitive adhesive or a solvent-based pressure-sensitive adhesive. Hot-melt pressure-sensitive adhesives are "cured" i.e. allowed to thicken and solidify, by cooling and solvent-based pressure-sensitive adhesives are "cured" by evaporation of the solvent therefrom.

In the embodiment illustrated in FIGS. 1 and 2, the coating head (4) comprises an adhesive extruder which in combination with a switchable pump (not shown) for the adhesive, is adapted to extrude a series of parallel beads (8) of adhesive of predetermined length onto the upper surface (5) of the release material (2). In this way, each patch (6) of adhesive is of predetermined shape and dimensions. The head (4) may be adapted to be raised and lowered intermittently in synchronism with the switching off and on of the pump. This gives greater dimensional control over the deposition of the adhesive.

Subsequently, a succession of labels (10) is fed onto the patches (6) of pressure-sensitive adhesive so that a row of the labels (10) is adhered by the pressure-sensitive adhesive to the release material (2). The labels (10) are fed by a label feed device, which includes a conveyor (12), which is known per se, such as that which is described in European Patent Specification No. 0098092 or in British Patent Specification No. 2164915. In one preferred arrangement, the labels (10) are sheets which have been lithographically printed on their upper surface. The applied labels (10) are deposited in such a manner, in spaced relation to each other, that each applied label (10) covers, and is adhered to the release material (2), by a respective patch (6) of adhesive. The shape and dimensions of the patches (6) and of the applied labels (10) are selected whereby substantially the entire rearwardly-directed surface (12) of each applied label (10) is coated with the pressure-sensitive adhesive and the edge (14) of each patch (6) is within the periphery (16) of the respective applied label (10).

The assembly of the succession of labels (10) adhered by the patches (6) of pressure-sensitive adhesive to the release material (2) is then wound into a reel (not shown).

Figure 3:
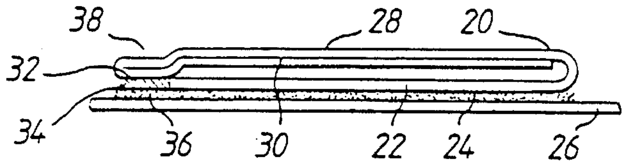
FIG. 3 is a diagrammatic elevation of a label made in accordance with a second embodiment of the present invention.

FIG. 3 shows a second embodiment of the present invention in which the applied label (20) is a folded sheet which has been lithographically printed. The folded sheet (20) comprises a rear panel (22) which is adhered by the patch (24) of pressure-sensitive adhesive to the release material (26), an upper panel (28) which is disposed over the rear panel (22) and an intermediate panel (30) which is disposed between the upper panel (28) and the rear panel (22). All of the panels are printed, e.g. lithographically. The intermediate panel (30) has an edge region (32) which is coated with a band (34) of material which renders the label hydrophobic. The band (34) contacts a corresponding band (36) of pressure-sensitive adhesive which is disposed along an edge region of the patch (24) of adhesive. The composite label (38) can be removed from the release material (26) and adhered by the patch (24) of pressure-sensitive adhesive to a container (not shown) to be labelled. When it is desired to open the label (38) the band (34) of hydophobic material is pulled away from the container thereby pulling away the band (36) adhesive therewith. When it is desired to reseal the label the band (36) of adhesive can be readhered to the container.

Figure 4:
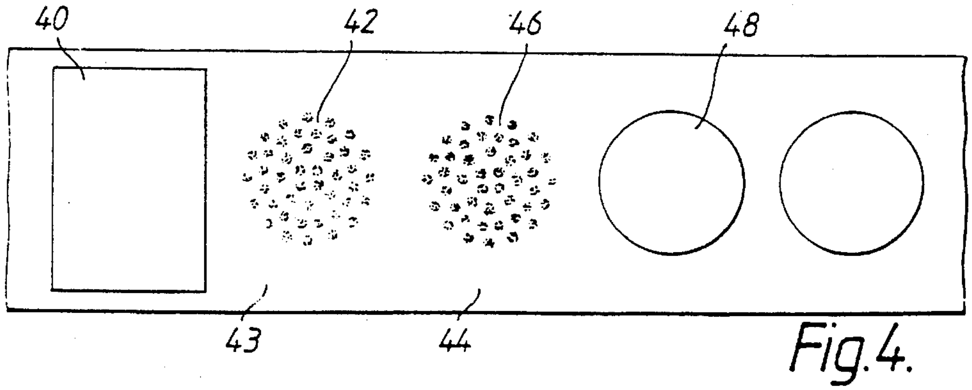
FIG. 4 is a plan view, similar to FIG. 2, of an arrangement for use in a method in accordance with a third embodiment of the present invention.

FIG. 4 shows a further embodiment of the present invention wherein the adhesive coating head (40) comprises a dot-matrix applicator which is adapted to apply a succession of patches of arrays (42) of dots of adhesive, each array (42) having predetermined shape and dimensions, to the upper surface (43) of the release material (44). In the illustrated embodiment, the patches (46) of adhesive comprising the arrays (42) are circular and subsequently a succession of circular labels (48) is applied to the patches (46) of adhesive. This embodiment provides the advantage that the dot-matrix applicator (40) can be employed to enable a label of any desired shape and dimensions to be adhered to the release material (44). As in the first embodiment, the coating head (4) may be adapted to be raised and lowered intermittently in synchronism with a pump for the coating head.

Figure 5:
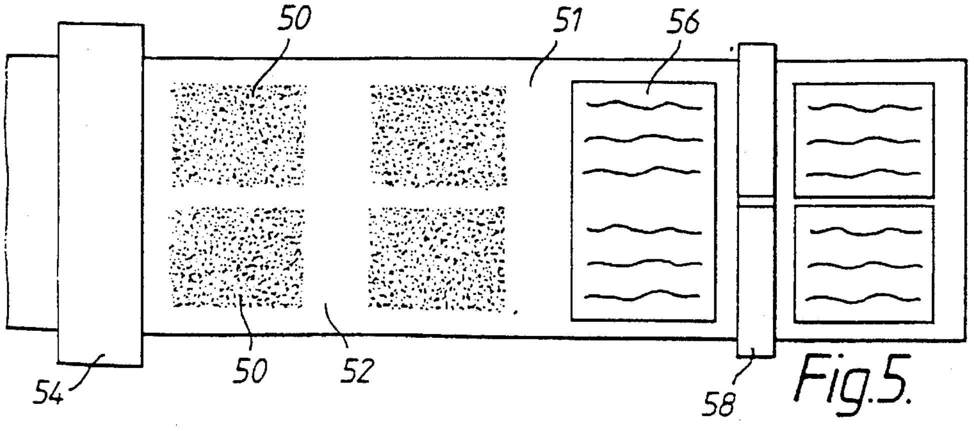
FIG. 5 is a plan view, similar to FIG. 2, of an arrangement for use in a method in accordance with a fourth embodiment of the present invention.

FIG. 5 illustrates a further embodiment of the present invention wherein the patches (50) of pressure-sensitive adhesive are applied to the upper surface (51) of the release material (52) by means of a printing device (54), for example a flexographic printing cylinder. In this embodiment, a plurality of patches (50) of pressure-sensitive adhesive are applied across the width of the release material (52) as well as along the length of the release material (52). The applied label (56) comprises a multiple label which is adhered to a plurality of patches (50) of adhesive across the width of the release material (52). A die-cutter (58) is provided which cuts from each applied multiple label (56) a plurality of self-adhesive labels (60) across the width of the release material (52). Each self-adhesive label (60) is adhered to the release material (52) by a respective patch (50) of adhesive. The waste label portions (not shown) between adjacent self-adhesive labels (60) are removed, for example by suction or by a blast of air.

In each of the disclosed embodiments the deposition of the pressure-sensitive adhesive onto the release material is carefully controlled by selective substantially instantaneous actuation of the coating head so that the applied patch of adhesive is only marginally smaller than the label applied thereto such that substantially the whole surface of the applied label is coated with adhesive but the adhesive does not extend beyond the periphery of the applied label, which could lead to adjacent layers of the reel being adhered together.

The present invention provides a real advantage over the prior art as exemplified by UK-A-2199010 in that it enables individual labels to be releasably adhered to a release web, for subsequent application to containers to be labelled, without any removal of excess adhesive or label portions being required. The present invention also obviates the need for a self-adhesive support web which is generally required in the prior art. The present invention can provide complete flexibility in the shape and dimensions of the resultant self-adhesive labels—it is merely necessary to control the adhesive applicator to apply an adhesive patch of predetermined shape and dimensions to the release material which correspond to those of the applied label.

I claim:

1. A method of producing a succession of self-adhesive labels on a length of release material, comprising the steps of:

(a) applying a succession of patches of pressure-sensitive adhesive to a surface of a length of release material, the adhesive being applied by a coating head under which the release material is fed and the coating head being raised and lowered intermittently in synchronism with switching on and off of the adhesive supply to the coating head to apply said succession of patches; and (b) applying a succession of individual labels to the patches of pressure-sensitive adhesive whereby each applied label is adhered to the release material by a respective patch of adhesive, each label comprising a folded sheet having an upper printed surface and an opposite rearwardly-directed surface;

wherein the shape and dimensions of the patches and the applied labels are selected whereby substantially the entire rearwardly-directed surface of each applied label is coated with the pressure-sensitive adhesive and edges of each patch lie within the periphery of the respective applied label.

2. The method according to claim 1 wherein the patches of pressure-sensitive adhesive are applied by means of an extruder which extrudes a series of parallel adhesive beads of predetermined length.

3. The method according to claim 2 wherein the individual labels are lithographically printed sheets.

4. The method according to claim 2 wherein each applied label comprises a multiple label and the method further comprises the steps of cutting a plurality of self-adhesive labels from each applied multiple label and removing waste label portions.

5. The method according to claim 1 wherein the patches of pressure-sensitive adhesive are applied by means of a dot-matrix applicator which applies an array of dots of adhesive, the array having a predetermined shape and dimensions.

6. The method according to claim 5 wherein the individual labels are lithographically printed sheets.

7. The method according to claim 5 wherein each applied label comprises a multiple label and the method further comprises the steps of cutting a plurality of self-adhesive labels from each applied multiple label and removing waste label portions.

8. The method according to claim 1 wherein the patches of pressure-sensitive adhesive are applied by printing.

9. The method according to claim 8 wherein the individual labels are lithographically printed sheets.

10. The method according to claim 8 wherein each applied label comprises a multiple label and the method further comprises the steps of cutting a plurality of self-adhesive labels from each applied multiple label and removing waste label portions.

11. The method according to claim 1 wherein the individual labels are lithographically printed sheets.

12. The method according to claim 11 wherein each applied label comprises a multiple label and the method further comprises the steps of cutting a plurality of self-adhesive labels from each applied multiple label and removing waste label portions.

13. The method according to claim 1 wherein each applied label comprises a multiple label and the method further comprises the steps of cutting a plurality of self-adhesive labels from each applied multiple label and removing waste label portions.

14. The method according to claim 1 wherein each applied label comprises a multiple label and the method further comprises the steps of cutting a plurality of self-adhesive labels from each applied multiple label and removing waste label portions.

15. A method of producing a succession of self-adhesive labels on a length of release material, the method comprising the steps of:

(a) applying a succession of patches of pressure-sensitive adhesive to a surface of a length of release material, the adhesive being applied by a coating head under which the release material is fed and the coating head being raised and lowered intermittently in synchronism with switching on and off of the adhesive supply to the coating head to apply said succession of patches; and (b) applying a succession of individual printed folded labels to the patches of pressure-sensitive adhesive, whereby each applied label is adhered to the release material by a respective patch of adhesive;

wherein the shape and dimensions of the patches and of the applied labels are selected whereby substantially the entire rearwardly-directed surface of each applied label is coated with the pressure-sensitive adhesive and edges of each patch lie within the periphery of the respective applied label.

16. A method according to claim 15, wherein the coating head is an extruder which is adapted to extrude a series of parallel adhesive beads of predetermined length.

17. A method according to claim 15, wherein the coating head is a dot-matrix applicator which is adapted to apply an array of dots of adhesive, the array having predetermined shaped and dimensions.

18. A method according to claim 15, wherein each applied label comprises a multiple label and further comprising the steps of cutting a plurality of self-adhesive labels from each applied multiple label and removing waste label portions.

* * * * *